US006616438B2

(12) United States Patent
Burlone et al.

(10) Patent No.: US 6,616,438 B2
(45) Date of Patent: Sep. 9, 2003

(54) CONTINUOUS POLYMERIZATION AND DIRECT FIBER SPINNING AND SYSTEMS FOR ACCOMPLISHING SAME

(75) Inventors: Dominick A. Burlone, Asheville, NC (US); Matthew B. Hoyt, Brownstown Township, MI (US); Charles F. Helms, Jr., Greenwood, SC (US); John A. Hodan, Arden, NC (US); Richard Kotek, Raleigh, NC (US); Carol W. Morgan, Asheville, NC (US); Randall A. Sferrazza, Asheville, NC (US); Fang A. Wang, Arden, NC (US); Otto M. Ilg, Asheville, NC (US); Terry D. Roberts, Candler, SC (US); Ronald G. Morrow, Enka, NC (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/879,066

(22) Filed: Jun. 13, 2001

(65) Prior Publication Data

US 2002/0058761 A1 May 16, 2002

Related U.S. Application Data

(62) Division of application No. 09/475,675, filed on Dec. 30, 1999, now Pat. No. 6,441,109.

(51) Int. Cl.$^7$ .............................................. B29C 47/80
(52) U.S. Cl. ................... 425/144; 425/192 S; 425/198; 425/378.2; 425/382.2; 425/464
(58) Field of Search .................... 425/144, 192 S, 425/198, 199, 378.2, 382.2, 464; 264/211.24

(56) References Cited

U.S. PATENT DOCUMENTS

| | | | | |
|---|---|---|---|---|
| 3,047,541 A | * | 7/1962 | Ryffel et al. | 264/210.6 |
| 3,376,369 A | | 4/1968 | Fisher | |
| 3,701,619 A | * | 10/1972 | Appeldoorn et al. | 425/198 |
| 4,067,861 A | * | 1/1978 | Biensan et al. | 264/211.24 |
| 4,362,682 A | * | 12/1982 | Berg et al. | 425/72.2 |
| 5,534,328 A | | 7/1996 | Ashmead et al. | |
| 5,658,537 A | | 8/1997 | Dugan | |
| 5,690,763 A | * | 11/1997 | Ashmead et al. | 156/60 |
| 5,851,562 A | * | 12/1998 | Haggard et al. | 425/198 |
| 6,392,007 B1 | * | 5/2002 | Buchanan et al. | 528/310 |
| 6,465,583 B1 | * | 10/2002 | Burlone et al. | 264/211.24 |

* cited by examiner

Primary Examiner—James P. Mackey
Assistant Examiner—Joseph Leyson
(74) Attorney, Agent, or Firm—Nixon & Vanderhye PC

(57) ABSTRACT

Continuous anionic polymerization and melt-spinning of a polycaprolactam includes forming a reaction mixture by bringing at least two streams of liquid caprolactam respectively containing a polymerization initiator and co-initiator into contact with one another, and then subjecting the reaction mixture to anionic polymerization reaction conditions in the reactor zone to obtain a molten polycaprolactam. The molten polycaprolactam is the directly (i.e., without intermediate solidification) transferred to, and extruded through, a fiber-forming orifice of a spinneret to form a fiber thereof. A spinneret zone downstream of the reactor zone thus receives the molten polycaprolactam directly from the reactor zone and forms a fiber therefrom by extruding it through the spinneret's fiber-spinning orifice.

11 Claims, 8 Drawing Sheets

Fig. 5
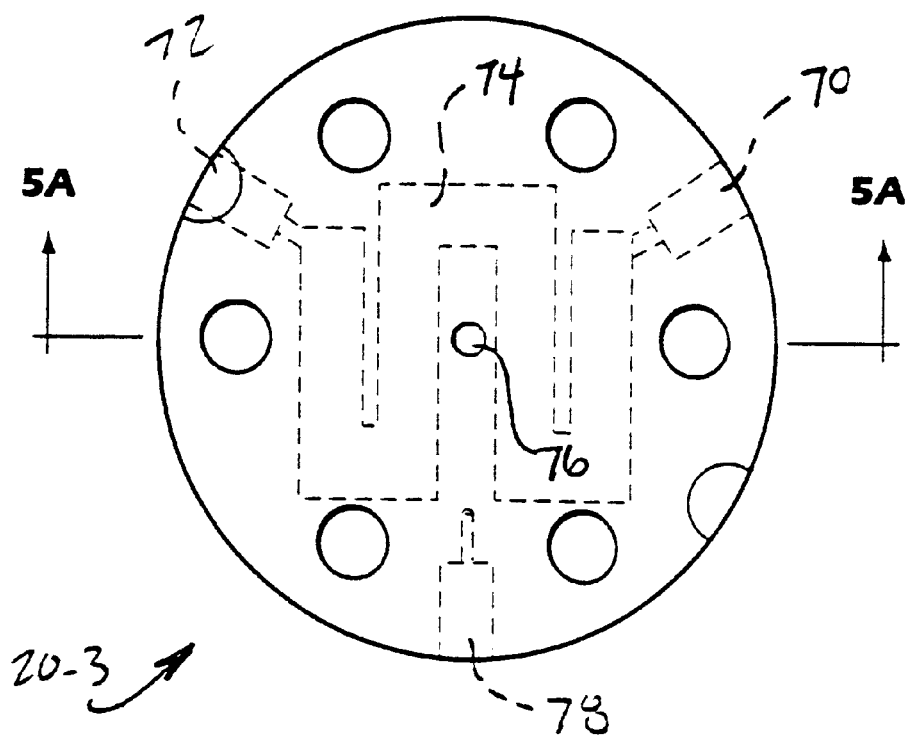
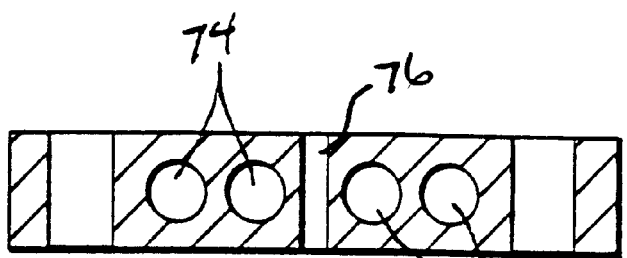
Fig. 5A

Fig. 8
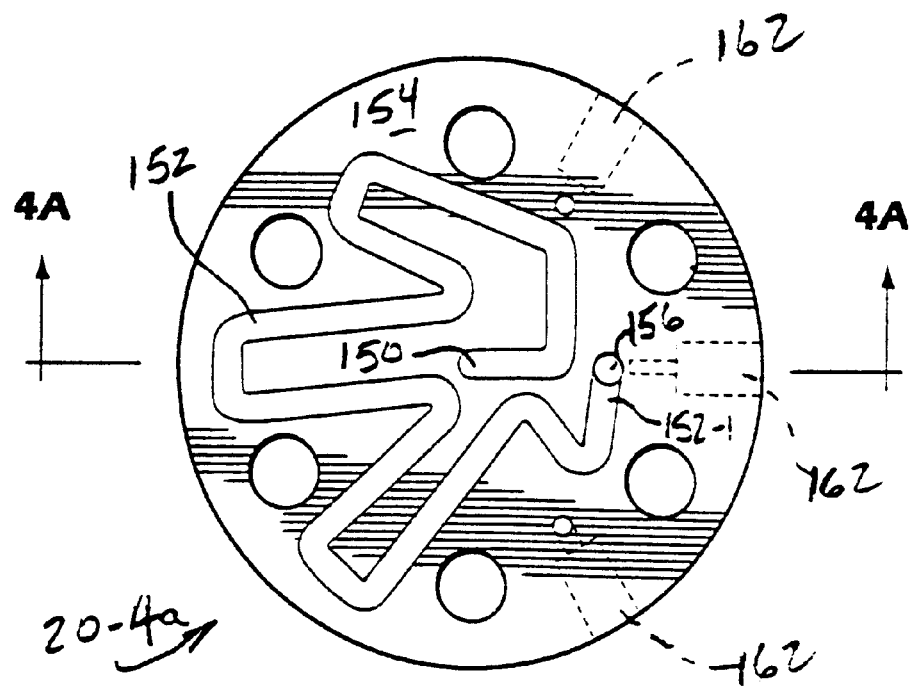
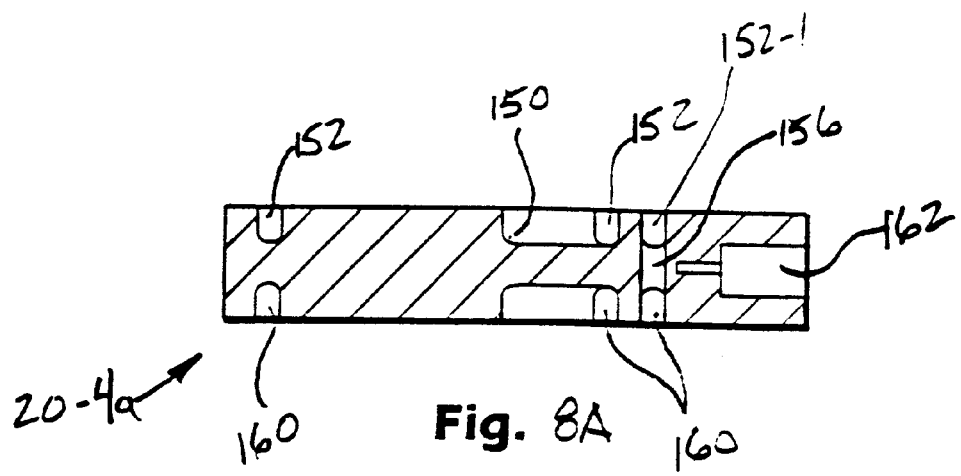
Fig. 8A

CONTINUOUS POLYMERIZATION AND DIRECT FIBER SPINNING AND SYSTEMS FOR ACCOMPLISHING SAME

This application is a division of U.S. application Ser. No. 09/475,675, filed Dec. 30, 1999, now U.S. Pat. No. 6,441,109, the entire content of which is hereby incorporated by reference in this application.

FIELD OF THE INVENTION

The present invention relates generally to the field of fiber spinning methods and apparatus, especially the melt-spinning of fibers from thermoplastic materials. In preferred forms, the present invention relates to the continuous direct spinning of anionically polymerized caprolactam, and to apparatus for accomplishing the same.

BACKGROUND OF THE INVENTION

The melt-spinning of thermoplastic materials to form essentially endless-length fibers is notoriously well known. Typically, the desired thermoplastic material from which fiber is to be melt-spun is polymerized from suitable monomers to form a solid reaction product. The resulting solid thermoplastic material is then formed into chips, washed and dried. The dried thermoplastic chips are then transported physically to the inlet of an extruder and re-melted. The melted thermoplastic material is discharged from the extruder and fed to a spinneret having numerous orifices shaped and sized to form the desired fiber cross-section. The molten thermoplastic material is thus extruded through the orifices of the spinneret to form a yarn composed of numerous melt-spun fibers. The extruded fibers are allowed to cool downstream of the spinneret and are then typically collected on a winder.

The anionic polymerization of monomeric lactams, especially caprolactam, to form polyamides is also well known. (See, for example, U.S. Pat. No. 3,342,784, the entire content of which is expressly incorporated hereinto by reference.) Such anionically polymerized lactams represent an attractive alternative to the conventional melt-spinning technique of re-melting solid thermoplastic materials and then extruding the melt through orifices of a spinneret. That is, the anionic polymerization of lactams exhibits faster reaction kinetics and requires fewer process steps as opposed to the more conventional hydrolytic route to the polymerization of lactams.

There are several problems inherent in the anionic polymerization of lactams due, for example, to the more complex chemistry involved as compared to the more conventional hydrolytic polymerization route. Specifically, the anionic polymerization of lactams usually involves both an initiator and a co-initiator to be present in the reaction mixture with the lactam monomer. The reaction is much more difficult to control due to the more sensitive temperature vs. time profiles that are needed. As a result, it is much more difficult to maintain consistent polymer properties and/or to include uniform distribution of additives in the polymer. Furthermore, the reaction streams must be mixed rapidly due to the rapid reaction rate to produce consistent product. Heat must be applied quickly and uniformly because the reaction is rapid and temperature-sensitive.

When one attempts to directly spin filaments of anionically polymerized caprolactam, these quick reaction times and temperatures are even further exacerbated due to the relative small size of the object being formed (i.e., the filament). Thus, it is critical that effective heat and mass transfer be present in order for the rapid production of uniform polymer for relatively small objects, such as melt-spun filaments where inconsistencies in molecular weight will produce denier variation, variation in dyeing and weaker filaments. It is therefore towards solving such problems associated with rapid and/or temperature sensitive reactions, such as the anionic polymerization of lactams, and their direct spinning into fiber that the present invention is directed.

SUMMARY OF THE INVENTION

Broadly, the present invention relates to processes and systems by which a stream of polymerization reactants having a relatively rapid reaction completion time may be polymerized continuously. In accordance with one aspect of the present invention, the polymerization reaction stream is continuously fed along a flow path sequentially through a mixer and a reactor zone having multiple substantially thermally-separated reactor sections along the stream's flow path. A reaction mixture is thus formed by rapidly mixing the reaction stream within the mixer on a time scale that is small in comparison to the reaction completion time of the polymerization reaction stream. Heat is uniformly applied across the reaction mixture within at least one of the reactor sections on a time scale that is small in comparison to the reaction completion time of the polymerization reaction stream.

In some specific preferred embodiments of the present invention, therefore, processes and apparatus are provided by which polymerization reactions which are rapid and/or temperature-sensitive can be effectively conducted and controlled. That is, according to the present invention, miniature reactors are employed having both effective mass transfer (resulting in good mixing of the reactants) and effective heat transfer (resulting in temperature equalization) on a time scale that is sufficiently small compared to the time needed for the reaction to proceed and on a space scale that is matched to the objects being produced directly from the polymer. In especially preferred embodiments, the present invention relates to the anionic polymerization of caprolactam using sufficiently miniaturized reactors and the direct spinning of the resulting polycaprolactam into fiber (i.e., without intervening solidification of the polycaprolactam) of commercially acceptable quality.

One exemplary useful embodiment of the present invention involves the continuous anionic polymerization and melt-spinning of a polycaprolactam by forming a reaction mixture from at least two streams of liquid caprolactam respectively containing a polymerization initiator and co-initiator, and then subjecting the reaction mixture to anionic polymerization reaction conditions to obtain a molten polycaprolactam. The molten polycaprolactam is then directly (i.e., without intermediate solidification) transferred to, and extruded through, a fiber-forming orifice of a spinneret to form a fiber thereof.

An exemplary system to achieve such continuous anionic polymerization and melt-spinning of polycaprolactam includes a mixer for receiving and mixing at least two streams of liquid caprolactam respectively containing a polymerization initiator and co-initiator, and a reactor and melt-spinning apparatus downstream of the mixer. The reactor and melt-spinning apparatus most preferably is formed of multiple plates which establish a reactor zone having a flow path for the reaction mixture which is sized and configured to achieve a predetermined residence time of the reaction mixture therein, and a temperature control zone in thermal communication with the reactor plate for controlling the temperature of the reaction plate to achieve anionic polymerization reaction conditions while the reaction mixture is flowing along the defined flow path therein to obtain the molten polycaprolactam. A spinneret zone downstream of the reactor zone thus receives the molten polycaprolactam directly and forms a fiber therefrom by extruding it through the spinneret's fiber-spinning orifice.

These and other aspects and advantages of the present invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein, FIG. 1 is a schematic representation of a system in accordance with the present invention whereby caprolactam may be anionically polymerized and directly melt-spun into fiber;

FIGS. 3–8 are top plan views of representative plates that may be employed in the miniature reactor of the present invention;

Figure 3:
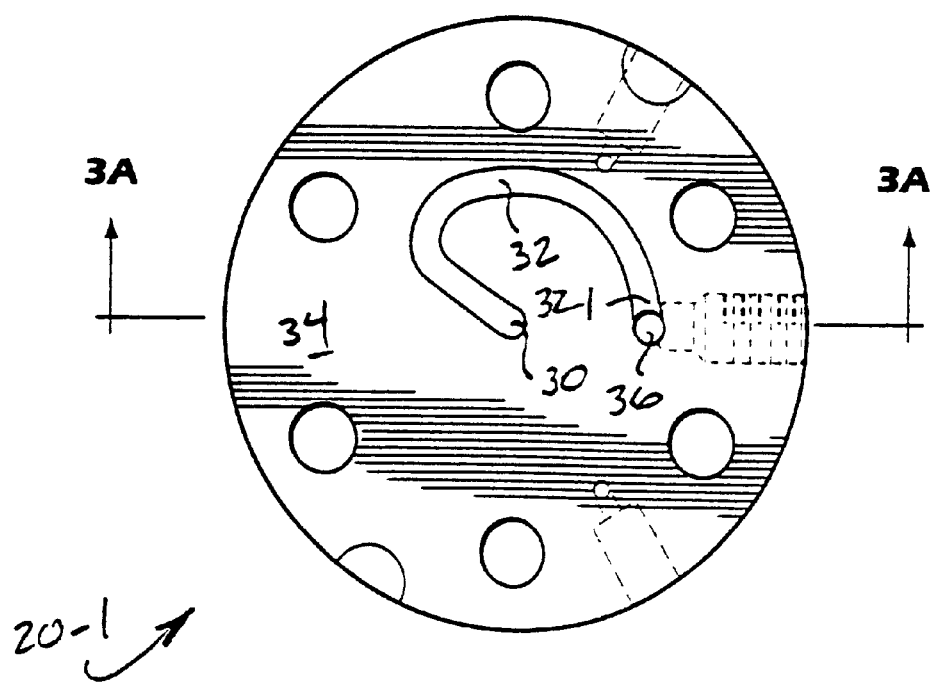
Figure 3A:
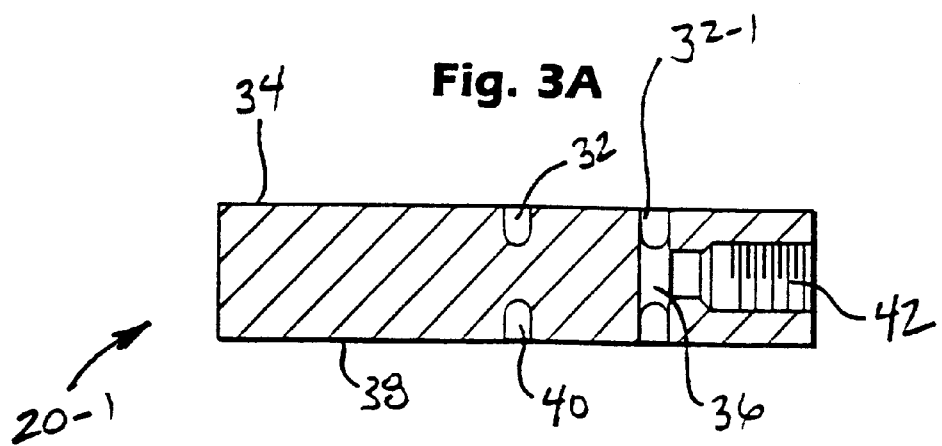
Figure 9A:
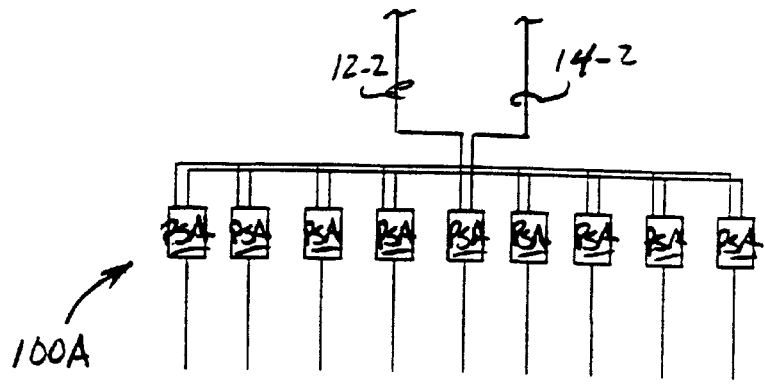
Figure 9B:
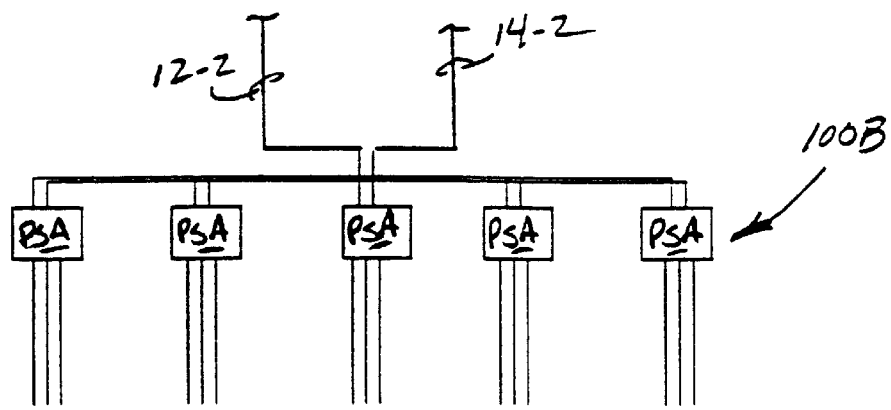

FIGS. 3A though 8A are cross-sectional views of the plates depicted in FIGS. 3–8, respectively; and FIGS. 9A and 9B schematically depict respective spin beam arrangements for spinning single or multiple fibers in accordance with the present invention.

DETAILED DESCRIPTION OF THE INVENTION

As used herein and in the accompanying claims, the term "fiber-forming" is meant to refer to polymers which are capable of being formed into a fiber structure having a length at least 100 times its width. The term "fiber" includes fibers of extreme or indefinite length (filaments) and fibers of short length (staple). The term "yarn" refers to a continuous strand or bundle of fibers. The term "rapid polymerization" means that reactants are polymerized to greater than about 80% completion (i.e., greater than about 80% of monomer exhaustion) in less than about ten (10) minutes. For some polymerization reactions for which the present invention is well suited, rapid polymerization and temperature equilibrium can take place in about 30 seconds or less.

The polymerization of caprolactam is accomplished generally by forming a reaction mixture comprised of caprolactam, an alkaline reaction initiator (catalyst), and a co-initiator (co-catalyst). This reaction mixture is then heated to reaction temperatures of between about 80° to about 250° C., and typically between about 150° to about 220° C. Polymerization proceeds for a total residence time of the reaction mixture in the miniature reactor of between about 1 minute to about 10 minutes, and preferably between about 2 minutes to about 8 minutes. Temperature control is effected over the reaction mixture in a manner to be described in greater detail below. Most preferably, the initiator and co-initiator are separately dissolved in respective supplies of caprolactam, and are then brought together for mixing immediately prior to the miniature reactor and spinneret assembly to be discussed below.

The initiator may be used in an amount between about 0.1 to about 5 mole %, and typically between about 0.6 to about 2.5 mole % of the reaction mixture. Suitable initiators include inorganic and organic alkaline initiators such as sodium hydride, metallic sodium, metallic lithium and/or potassium t-butoxide, for example.

The co-initiator is also typically used in an amount between about 0.1 to about 5 mole %, and typically between about 0.6 to about 2.5 mole % of the reaction mixture. Suitable co-initiators include dicyclohexylcarbodiimide, diisopropylcarbodiimide, acetyl caprolactam, isopropyliisocyanate, phenyliisocyanate, cyclohexyliisocyanate, isophoronediisocyanate, N,N'-dimethylglycinecaprolactam, and mixtures thereof.

The polymerization conditions are chosen so as to achieve desired polymer properties. Preferably, the anionically polymerized reaction products of this invention will exhibit a relative viscosity (RV) of between about 2.1 to about 11.3, an amino end group (AEG) content of between about 1 to about 90 meq/kg, and a carboxyl end group content of between about 1 to about 60 meq/kg. The polymers will also exhibit relative low organic extractables of less than about 15%, and typically between about 1.5 to about 12%.

Figure 1:
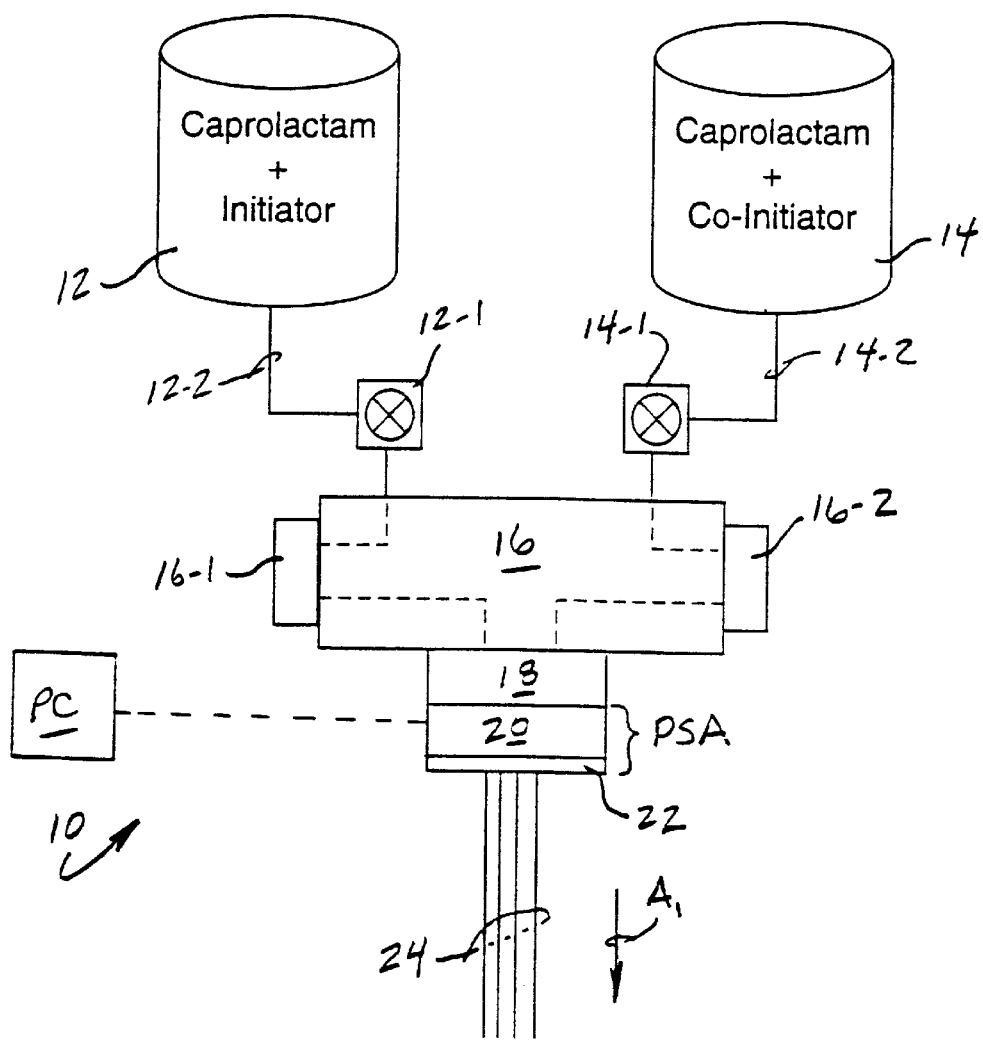

One particularly preferred system 10 to form directly anionically polymerize caprolactam and melt-spin the resulting polymer into fibers is shown in accompanying FIG. 1. The system 10 includes sources 12, 14 of caprolactam in which is dissolved an initiator and co-initiator, respectively. These liquid reaction components are then pumped separately through the metering block 16 by means of separate metering pumps 16-1, 16-2, respectively. Shut-off valves 12-1, 14-1 in feed lines 12-2, 14-2, respectively, may be provided upstream of the metering block 16, if desired.

The metered flows of the liquid reaction components from sources 12, 14 are then transferred immediately to a contiguous polymerization and spinneret assembly PSA. The preferred polymerization and spinneret assembly PSA includes a static mixing device 18, a miniature reactor 20 and a spinneret 22 contiguously stacked in that order relative to the spinning axis $A_s$. Most preferably, the mixing device 18 is a series of plates which form a pixelated liquid stream of the separate liquid reaction components to thereby facilitate the complete mixing and reaction thereof as described more completely in co-pending and commonly owned U.S. patent application Ser. No. 09/475,231 filed on Dec. 30, 1999 (now U.S. Pat. No. 6,392,007), the entire content of which is expressly incorportated hereinto by reference. A mixing device after the reactor may be used to enhance the uniformity of the reactor product.

The mixed reaction component streams are then immediately directed into a miniature reactor 20. In this regard, as will be discussed in greater detail below, the miniature reactor 20 is comprised of a series of stacked plates which establish control over the temperature and residence times of the reaction mixture stream. The temperature of the reactor 20 is also maintained so that the resulting anionic polymerization reaction product is maintained in its molten state and discharged directly from the reactor 20 to a spinneret 22. The spinneret plate 22 is, in and of itself conventional, in that it is provided with at least one, and preferably a dense plurality of, orifices through which the molten polymer discharged from the reactor 20 is extruded forming a curtain of melt-spun fibers 24. These fibers 24 are allowed to cool and solidify downstream of the spinneret 22 as is well known so that the solidified fibers may be taken up by a downstream winder (not shown). In this regard, each individual fiber 24 may be wound separately to form a package, or the fibers 24 may be collected to form a yarn, which is then taken up to form a package by the downstream winder.

Figure 2:
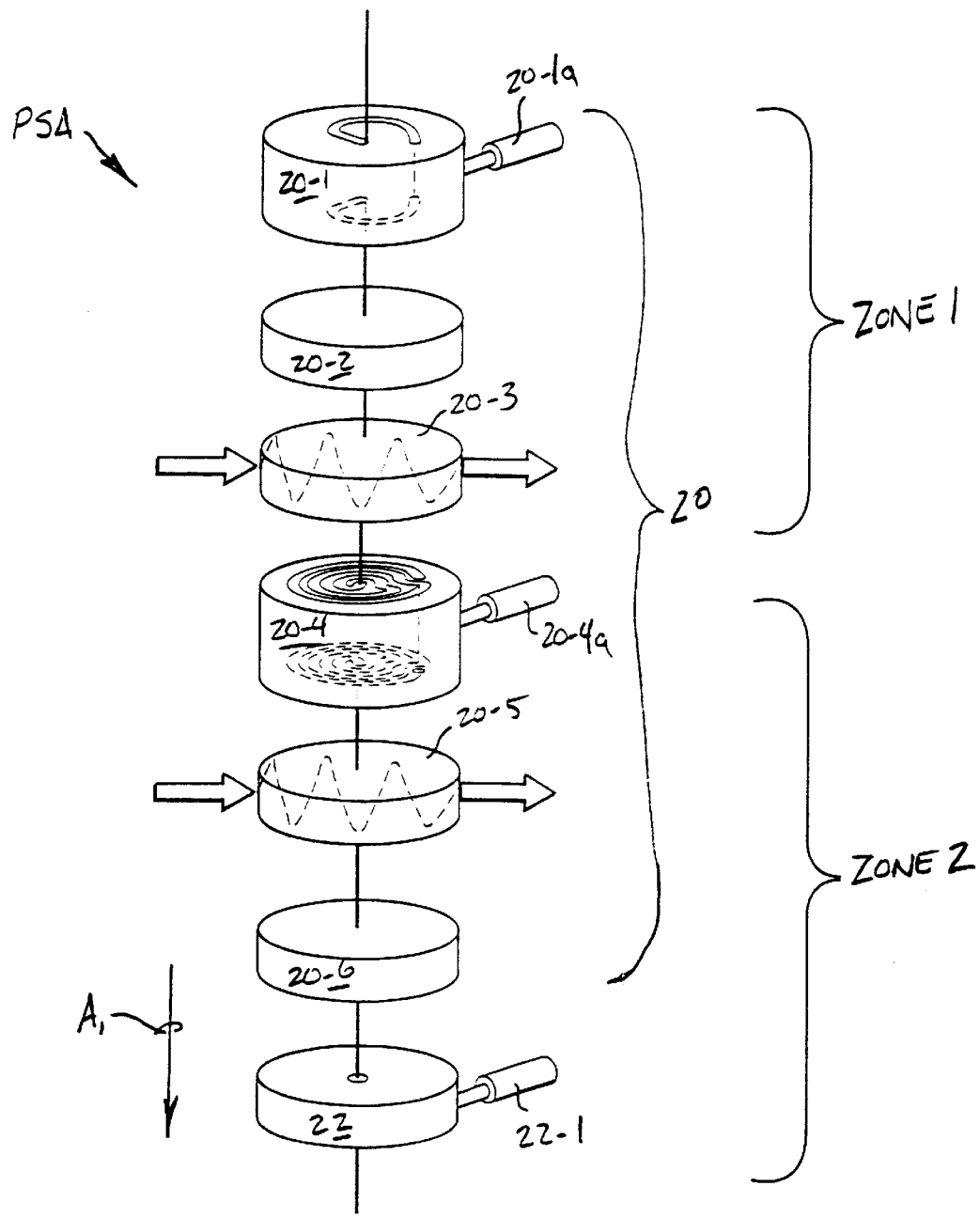
FIG. 2 is a schematic perspective view of one exemplary contiguous miniature reactor and spinneret assembly that may be employed in the system depicted in FIG. 1.

An enlarged schematic exploded perspective view of one exemplary polymerization and spinneret assembly PSA is depicted in accompanying FIG. 2. As shown, the reactor 20 includes a number of contiguous stacked plates 20-1 through 20-6. This series of plates includes reactor plates 20-1 and 204 separated from one another along the fiber-spinning axis $A_s$ by a pair of heater and cooling plates 20-2 and 20-3, respectively. Another pair of cooling and heater plates 20-5 and 20-6, respectively, is interposed between the reactor plate 204 and the spinneret plate 22. Heater plates 20-2 and 20-6 may be heated by a suitable fluid, or in the embodiment depicted, by electrical resistance. The cooling plates 20-3 and 20-5, on the other hand, most preferably include a cooling channel through which a cooling fluid (e.g., air) flows.

Collectively, therefore, the heater and cooling plates 20-2, 20-6 and 20-3, 20-5, respectively, impart independent temperature control of the reactor 20. Thus, for example, the heater and cooling plates 20-2 and 20-3 are preferably operated so as to achieve an upstream zone (Zone 1) of temperature control sufficient for the anionic polymerization of caprolactam, while the cooling and heater plates 20-5 and 20-6, respectively, serve to establish a downstream temperature zone (Zone 2) to maintain the anionic polymerization reaction product in a molten state sufficient for melt-spinning through the spinneret 22. In other words, the cooling plates 20-3, 20-5 serve to thermally isolate adjacent temperature zones (e.g., Zones 1 and 2). The heater plates 20-2 and 20-3 can thus be operated so as to achieve a desired set point temperature within each of the Zones 1 and 2. As such, the thermal isolation effectively provided by the cooling plates 20-3 and 20-5 allow for independent temperature control to be achieved within each of the Zones 1 and 2 which, in turn, allows for a desired temperature profile to be achieved as the reaction mixture flows through the reactor 20.

The residence time of the reaction mixture in the reactor 20 is controlled by the flow path length and/or volumetric capacity thereof established by the reactor plates 20-1, 204 and the rate at which the reactants are pumped into the reactor. Thus, for example, at a desired volumetric throughput, the upstream reactor 20-1 may be provided with a flow channel length and/or volumetric capacity so that the reaction mixture has a relatively short residence time therein as compared to the residence time of the reaction mixture within the reactor plate 20-4. As can be appreciated, virtually any number of reactor plates with or without associated heating and cooling plates can be provided. Furthermore, the residence times of such reactor plates can be predetermined such that virtually any combination of such plates can be preselected to achieve virtually any desired time versus temperature profile through the reactor 20. Since the rate of reactor component injection will also determine the fiber weight, it is particularly advantageous to be able to very simply change the reactor volume.

The reactor plates 20-1 and 204 may be provided with respective temperature/pressure sensors 20-1a and 20-4a which output temperature/pressure signals to a programmable controller PC (see FIG. 1) indicative of the temperature and pressure of the respective reaction mixtures therein. Furthermore, the spinneret plate 22 may be provided with a suitable pressure sensor 22-1 which also supplied the controller PC with a pressure signal indicative of the pressure of the molten polymer being supplied to the spinneret plate 22 from the reactor 20. In such a manner, the controller PC can exercise suitable control over the heater and cooling plates 20-2, 20-6 and 20-3, 20-5, respectively, to maintain the reaction mixture within the reactor 20 within suitable set limits.

Exemplary plates that may be employed in the reactor 20 of the present invention are depicted in accompanying FIGS. 3–7 and cross-sectional elevational views thereof as depicted in accompanying FIGS. 3A–6A. In this regard, it will be understood that the various flow path configurations are exemplary only and are not meant to limit the present invention. Thus, for example, the reactor plates may be provided with virtually any desired flow path configuration in order to achieve the desired residence time for a particular volumetric throughput. The various plates may be assembled in any desired order so as to obtain virtually any desired number of process zones and thereby to achieve virtually any time-versus-temperature profile for the reaction mixture as it flows through the reactor 20.

The reactor plate 20-1 shown in FIGS. 3 and 3A has an inlet region 30 and a generally arcuate flow path 32 formed in its upper face 34 thereof. The inlet region 30 receives the reaction mixture flow from an adjacent upper plate-for example, from the static mixer 18 as shown in FIG. 1. The terminal end 32-1 of the flow path 32 communicates with an aperture 36 so as to transfer the bottom face 38 of the reactor plate 20-1, where another flow path 40 is defined. Most preferably the flow paths 32 and 40 are mirror images of one another. As note briefly above, the lengths and/or depths of the flow paths 32 and 40 are designed so as to achieve a desired residence time of the reaction mixture therein for a given volumetric throughput. A threaded hole 42 is provided in the lateral side of the plate 20-1 so as to receive therein the temperature and pressure sensor 20-1a (see FIG. 2).

Figure 4:
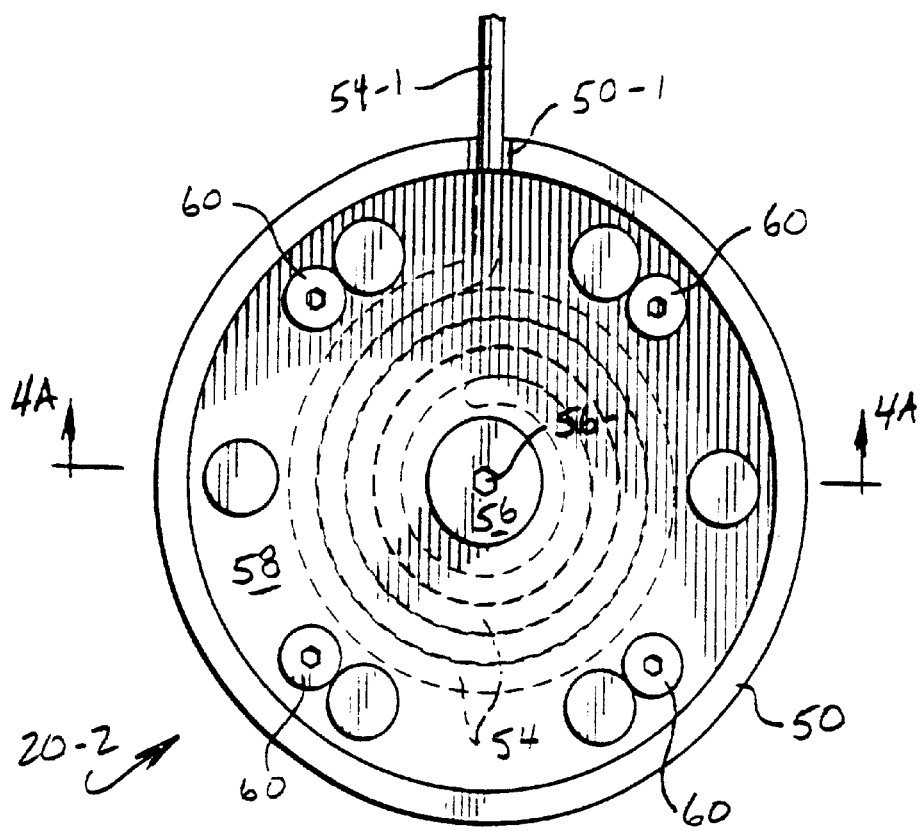
Figure 4A:
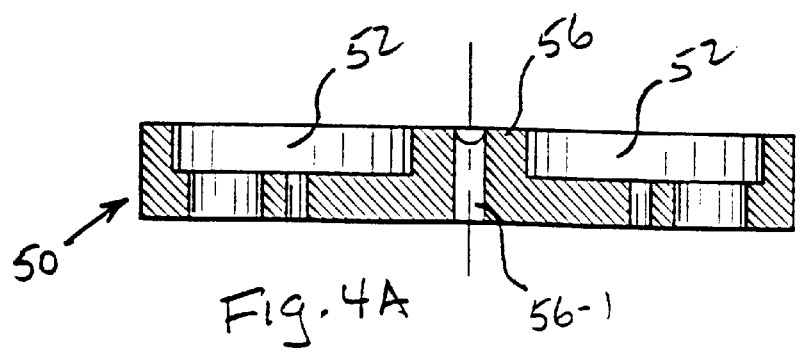

One preferred form of heater plate 20-2 is shown in accompanying FIGS. 4 and 4A and is representative of the heater plate 20-6. In this regard, the heater plate 20-2 includes a base plate 50 which is provided with an annular recess 52 adapted to receive therein an electrical resistance element 54. The lead 54-1 of the element 54 exits the base plate 50 via aperture 50-1 and is connected to an available electrical power source. The central region 56 of the of the base plate 50 defines and aperture 56-1 through which the reaction mixture flows. The recess 52, and the element 54 are covered by a planar lid member 58 and rigidly held to the base plate 50 by means of appropriate flush-mounted bolts 60. For clarity of presentation, the base plate 50 is only shown in FIG. 4A without the associated element 54 and lid 58.

One possible exemplary cooling plate 20-3 that may be employed in the reactor 20 of this invention is depicted in accompanying FIGS. 5 and 5A. The plate 20-3 is provided with fluid inlet and outlet openings 70, 72 and a closed flow channel 74 therebetween. A central aperture 76 receives the reaction mixture flow from an immediately adjacent upper plate-for example, for the heater plate 20-2 described above. As shown, the central aperture passes the reaction mixture to the next adjacent low plate in the stack (e.g., to reactor plate 204) for further reaction as may be desired. Thus, the reaction mixture will be cooled somewhat by virtue of the cooling fluid flowing through the channel 74. The rate and/or temperature of the cooling fluid can of course be controlled for a given throughput of reaction mixture so as to achieve the desired cooling effect. A blind hole 78 is provided in the lateral side of the plate 20-3 to accept a temperature sensor (not shown) therein. The cooling plate 20-5 shown in FIG. 2 may be the same as cooling plate 20-3 depicted in FIGS.

5 and 5A. However, it could also be somewhat different so as to achieve the desired cooling effect on the reaction mixture.

Figure 6:
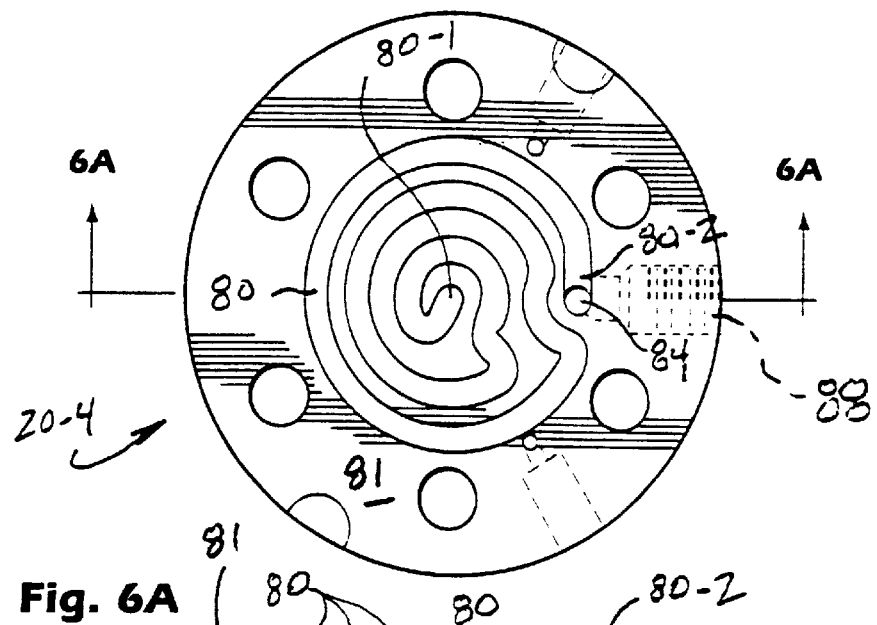
Figure 6A:
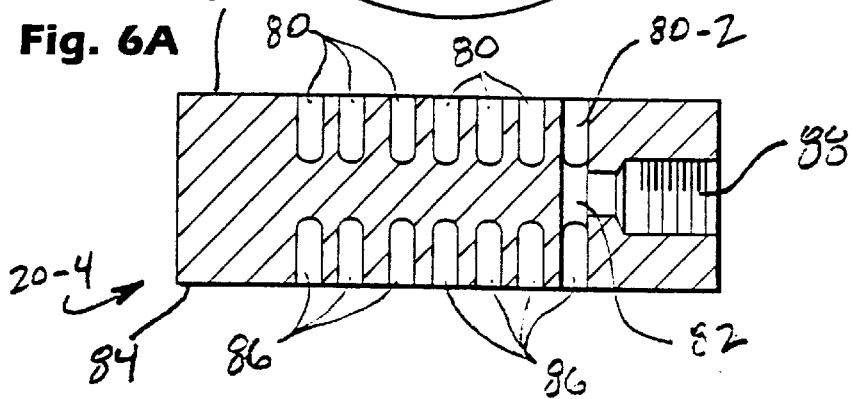
Figure 7:
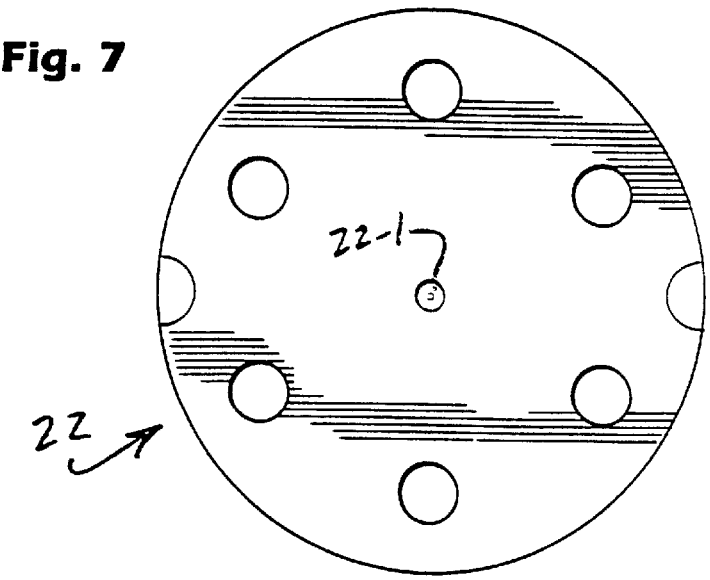

FIGS. 6 and 6A depict the reactor plate 204 that may be employed in the reactor 20. It will be observed that the reactor plate 204 has a generally concentrically disposed continuous flow path 80 defined in an upper face 81 of the plate 204 between its inlet end region 80-1 and its outlet end 80-2. It will be observed that the depth of flow path 80 of reactor 204 is greater as compared to the depth of flow path 32 in reactor plate 20-1 depicted in FIGS. 3 and 3A. Therefore, the increased length and greater depth of the flow path 80 as compared to such flow path 32 causes the reaction mixture to experience a greater residence time in the former as compared to the latter.

The inlet region 80-1 of flow path 80 receives the reaction mixture flow from an adjacent upper plate-for example, from the cooling plate 20-3 as shown in FIG. 1. The terminal end 80-2 of the flow path 80 communicates with an aperture 82 so as to transfer the reaction mixture to the bottom face 84 of the reactor plate 204, where another flow path 86 is defined. Most preferably the flow paths 80 and 86 are mirror images of one another. A threaded hole 88 is provided in the lateral side of the plate 20-4 so as to receive therein the temperature and pressure sensor 20-4a (see FIG. 2).

As noted previously, the reaction mixture will exit the reactor plate 20-4 and then flow through the cooling plate 20-5 and heating plate 20-6. The cooling plate 20-5 serves to thermally isolate Zone 2 of the actor 20 from the spinneret 22, whereas the heating plate 20-6 serves to heat the spinneret plate 22 and thereby maintain the polycaprolactam to be melt-spun at the desired melt temperature. The molten polycaprolactam will thus be transferred directly from the reactor plate 20-4 to the spinneret 22, and be extruded through the fiber-spinning orifice 22-1 formed therein.

An alternative reactor plate 20-4a is shown in FIGS. 8 and 8A. In this regard, the reactor plate 20-4a includes an inlet region 150 and a serpentine-like flow path 152 formed in its upper face 154. The inlet region 150 receives the reaction mixture flow from the outlet of an immediately adjacent upper plate-for example, from the path 140 of reactor plate 20-4a if positioned adjacent thereto. The terminal end 152-1 of the flow path 152 communicates with an aperture 156 so as to transfer the reaction mixture flow to the bottom face 158 of the reactor plate 20-4a, where another flow path 160 is defined. Most preferably the flow paths 132 and 140 are mirror images of one another. Again, the lengths and/or depths of the flow paths 152 and 160 are designed so as to achieve a desired residence time of the reaction mixture therein for a given volumetric throughput as has been described previously. A series of blind holes 162 are provided in the lateral side of the plate 20-4a so as to receive therein a heater element (not shown), such as an electric resistance type heater element. The reactor plate 20-4a may be employed in lieu of, or in addition to, the reactor plates 20-2 and 20-4 discussed previously.

Accompanying FIGS. 9A and 9B show two possible spin beams 100A, 100B, respectively, that employ a contiguous polymerization and spinneret assembly PSA described previously. In this regard, the spin beam 100A shown in FIG. 9A includes a single contiguous polymerization and spinneret assembly PSA to melt-spin a single fiber F1. The spin beam 100B, on the other hand, melt-spins multiple fibers F2 from a single contiguous polymerization and spinneret assembly PSA. It will be recognized by those in this art, therefore, that each polymerization and spinneret assembly PSA may be identical to others in the same spin beam 100A or 100B to thereby produce a polycaprolactam fiber or fibers with substantially the same properties. Alternatively, one or more of the individual contiguous polymerization and spinneret assemblies PSA may be differently configured (e.g., in terms of the types and/or configuration of the plates included within their respective reactor 20) to produce polycaprolactam fiber or fibers of different properties. In the latter situation, the resulting properties of a yarn of such polycaprolactam fibers can be engineered as may be desired.

The present invention will be further understood by reference to the following non-limiting Examples thereof.

EXAMPLES

Example I

A three-zone reactor was constructed of contiguous reactor and heater and cooling plates as described previously. Zone 1 of the reactor consisted of a cooling plate, a 5 cm$^3$ reactor plate, a heater plate, a pressure plate (i.e., a plate which includes one or more tapped holes in communication with the reaction mixture flow therethrough to receive pressure and/or temperature sensors), and a cooling plate in that order relative to the melt-spinning axis. Zone 2 of the reactor consisted of a first 20 cm$^3$ reactor plate, a heater plate, a pressure plate, a second 20 cm$^3$ reactor plate, and a cooling plate in that order relative to the melt-spinning axis. Zone 3 of the reactor consisted of a 20 cm$^3$ reactor plate, a heater plate and a pressure plate in that order relative to the melt-spinning axis. The pressure plates in each of Zones 1–3 were fitted with a temperature and pressure sensor so as to sense the temperature and pressure of the reaction mixture or reaction product as the case may be. A static mixer and a single orifice spinneret (orifice size=1 to 5 mm) were provided contiguously at the top of Zone 1 and the bottom of Zone 3 of the reactor, respectively.

A solution of caprolactam containing 1.2 mole % of sodium hydride (NaH) as an initiator was metered at a throughput of 20 g/min into the static mixer in a 1:1 ratio simultaneously with a solution of caprolactam containing 1.2 mole % of dicyclohexyldicarbidiimide (DCC) as a co-initiator.

The temperatures, residence times and pressures employed in each of the reactor Zones 1–3 are noted below in Table I:

TABLE I

|  | Zone 1 | Zone 2 | Zone 3 |
| --- | --- | --- | --- |
| Temperatures, ° C. | 190 | 250 | 240 |
| Residence Time, min. | 0.25 | 2.0 | 1.0 |
| Pressures, psi | 40–170 | 40–170 | 40–60 |

The resulting polycaprolactam fiber had a relative viscosity (RV) of 2.69, an amino end group (AEG) content of 65.2 meq/kg and an extractables content of about 11.2%.

Example II

Example I was repeated except that Zone 2 of the reactor consisted of a first 20 cm$^3$ reactor plate, a second 20 cm$^3$ reactor plate, a heater plate, a pressure plate, and a cooling plate in that order relative to the melt-spinning axis. The throughput of the reaction mixture was 4 g/min, and the temperatures, residence times and pressures employed in each of the reactor Zones 1–3 are noted below in Table II:

TABLE II

|  | Zone 1 | Zone 2 | Zone 3 |
| --- | --- | --- | --- |
| Temperatures, ° C. | 220 | 262 | 224 |
| Residence Time, min. | 1.25 | 10.0 | 5.0 |
| Pressures, psi | 270–700 | 200–300 | 80–200 |

The resulting polycaprolactam fiber had a relative viscosity (RV) of 2.93, an amino end group (AEG) content of 60.7 meq/kg, a carboxyl end group (CEG) content of 13.0 meq/kg, and an extractables content of about 13.3%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for the continuous anionic polymerization and melt-spinning of a polycaprolactam comprising:
   (a) a mixer for receiving and mixing at least two streams of liquid caprolactam respectively containing a polymerization initiator and co-initiator; and
   (b) a reactor and melt-spinning apparatus downstream of said mixer, which includes:
       (1) a reactor zone having at least a first set of reactor plates defining a flow path for the reaction mixture which is sized and configured to achieve a predetermined residence time of the reaction mixture therein;
       (2) a temperature control zone having at least one pair of plates comprising at least one heating plate and at least one cooling plate in thermal communication with the first set of reactor plates to thermally isolate the said first set of reactor plates to allow for independent temperature control thereof and to thereby achieve anionic polymerization reaction conditions while the reaction mixture is flowing along the defined path therein to obtain a molten polycaprolactam; and
       (3) a spinneret zone having a fiber-spinning orifice located downstream of said reactor zone to receive the molten polycaprolactam formed in said reactor zone and extrude the molten polycaprolactam through the fiber-spinning orifice to thereby form a fiber thereof.

2. The system of claim 1, wherein the first set of reactor plates in said reactor zone includes first and second sequentially positioned reactor plates.

3. The system of claim 2, wherein the first and second reactor plates each define a respective flow path for the reaction mixture which is sized and configured to achieve a predetermined residence time of the reaction mixture as it flows between an inlet and an output of each plate, and wherein the residence times of said first and second reactor plates are different from one another.

4. The system of claim 2, wherein said at least one pair of heating and cooling plates is interposed between the first and second reactor plates.

5. The system of claim 4, wherein the temperature control zone includes a second pair heating and cooling plates positioned downstream of and in thermal communication with said second reactor plate of the reactor zone to achieve independent temperature control over the reaction mixture therein.

6. The system of claim 1, wherein the set of reactor plates of the reactor zone includes first and second reactor plates, and wherein said at least one pair of said heating and cooling plates is interposed between the first and second reactor plates such that said heating plate is upstream of said cooling plate.

7. The system of claim 1, wherein said set of reactor plates of said reactor zone includes at least two contiguous reactor plates each defining a respective flow path sized and configured to achieve a predetermined residence time for the reaction mixture therein.

8. The system of claim 1, wherein said set of reactor plates of said reactor zone includes multiple sequential reactor plates each defining a respective flow path which is sized and configured to provide a predetermined residence time for the reaction mixture therein, and wherein the temperature control zone includes (i) multiple pairs of heating and cooling plates operatively associated with each respective one of said reactor plates, and a (ii) a controller for controlling said multiple pairs of said heating and cooling plates to thereby individually control the temperature of the multiple reaction plates to achieve a desired time versus temperature reaction profile for the reaction mixture.

9. The system of claim 7, wherein the two contiguous reactor plates have respective predetermined residence times and wherein the temperature control zone includes a controller for controlling the temperatures the two contiguous reactor plates so as to have respective predetermined temperatures.

10. The system of claim 7, wherein at least two of the multiple reactor plates have respective predetermined residence times and wherein the controller controls the temperatures thereof so as to have respective predetermined temperatures.

11. The system of claim 1, wherein the first set of reactor plates includes at least first and second reactor plates having respectively different residence times.

* * * * *